United States Patent [19]

Douglas et al.

[11] 4,117,459

[45] Sep. 26, 1978

[54] TIME-OUT INTERFACE MEANS

[75] Inventors: Robert H. Douglas; Edward H. Forrester; David Murray, all of Phoenix, Ariz.

[73] Assignee: Honeywell Inc., Minneapolis, Minn.

[21] Appl. No.: 802,873

[22] Filed: Jun. 2, 1977

Related U.S. Application Data

[63] Continuation-in-part of Ser. No. 788,586, Apr. 8, 1977, abandoned.

[51] Int. Cl.$^2$ .............................................. H04Q 1/00
[52] U.S. Cl. ............................ 340/147 R; 340/152 R
[58] Field of Search ......... 340/147 R, 147 LP, 152 R, 340/163; 178/66 R; 179/2 DP

[56] References Cited

U.S. PATENT DOCUMENTS

| Re. 29,246 | 5/1977 | Ricci | 340/147 LP |
| 3,745,251 | 7/1973 | Fretwell | 178/66 R |
| 3,764,977 | 10/1973 | Weeden, Jr. | 340/147 R |

*Primary Examiner*—Donald J. Yusko
*Attorney, Agent, or Firm*—Laurence J. Marhoefer

[57] ABSTRACT

There has been provided, in a computer system, a control unit having authority over a plurality of subordinate units with differing response times. The control unit addresses and issues command instructions to selected ones of the subordinate units then waits for an acknowledgement of completion from the addressed units before going to the next step in its routine. To prevent the control unit from being hung-up in the event of a failure of response from the subordinate unit, time-out means are provided for releasing the control unit for further operation. Since the response times of the individual subordinate units are unknown to the control unit, a unique time-out circuit is provided for each of the subordinate units, each time-out circuit being commensurate with the response time of the associated subordinate unit.

8 Claims, 2 Drawing Figures

TIME-OUT INTERFACE MEANS

CROSS-REFERENCE TO OTHER APPLICATIONS

The present application is a continuation-in-part of copending application Ser. No. 788,586, filed Apr. 8, 1977 and now abandoned, in the name of the present inventors and assigned to the assignee of the present application.

BACKGROUND OF THE INVENTION

The present invention relates to computer systems and, more particularly, to interface apparatus for use in such a computer system.

In computer systems, there is provided one or more control units having authority over several subordinate units. The control unit may be the central processor or some lower level control unit. The subordinate units may, in fact, be any of a number of different types of peripheral devices. In operation, such a control unit communicates with the subordinate units over a communication bus. The control unit selects one of the subordinate units, addresses it and issues requests and command signals. It then awaits an acknowledge signal from the addressed subordinate unit to indicate that the command has been executed. In order to prevent the control unit from getting hung-up in the event of a malfunction or absence of the addressed subordinate unit from which no acknowledge signal is received, means must be provided for freeing the control unit. To that end, a timing unit has been incorporated into the control unit to effect a release of the control unit if no acknowledge signal has been received by a predetermined time after the issuance of the command signal. The subordinate units do not all have the same response time. For example, some of the units may respond in less than a microsecond while others may require several milliseconds. In the systems heretofore provided, to accommodate the wide range of response times, the timer was set to run out after a period slightly longer than the longest response time of any of the subordinate units associated therewith. That, however, effectively wastes a great amount of time slowing the entire system to the speed of the slowest element.

SUMMARY OF THE INVENTION

It is accordingly, an object of the present invention to provide an improved interface means for use in computer apparatus.

It is another object of the present invention to provide an improved interface means as set forth which features an improved time efficiency.

A further object of the present invention is to provide, in a computer system, means for effecting communications between a control unit and any of a plurality of subordinate units with a minimum time-out period.

In accomplishing these and other objects, there has been provided, in accordance with the present invention, in a computer system, a control unit having authority over a plurality of subordinate units with differing response times. The control unit addresses and issues command instructions to selected ones of the subordinate units then waits for an acknowledgement of completion from the addressed units before going to the next step in its routine. To prevent the control unit from being hung-up in the event of a failure of response from the subordinate unit, time-out means are provided for releasing the control unit for further operation. Since the response times of the individual subordinate units are unknown to the control unit, a unique time-out circuit is provided for each of the subordinate units, each time-out circuit being commensurate with the response time of the associated subordinate unit.

BRIEF DESCRIPTION OF THE DRAWINGS

A better understanding of the present invention may be had from the following detailed description when read in the light of the accompanying drawings, in which.

DETAILED DESCRIPTION

Figure 1:
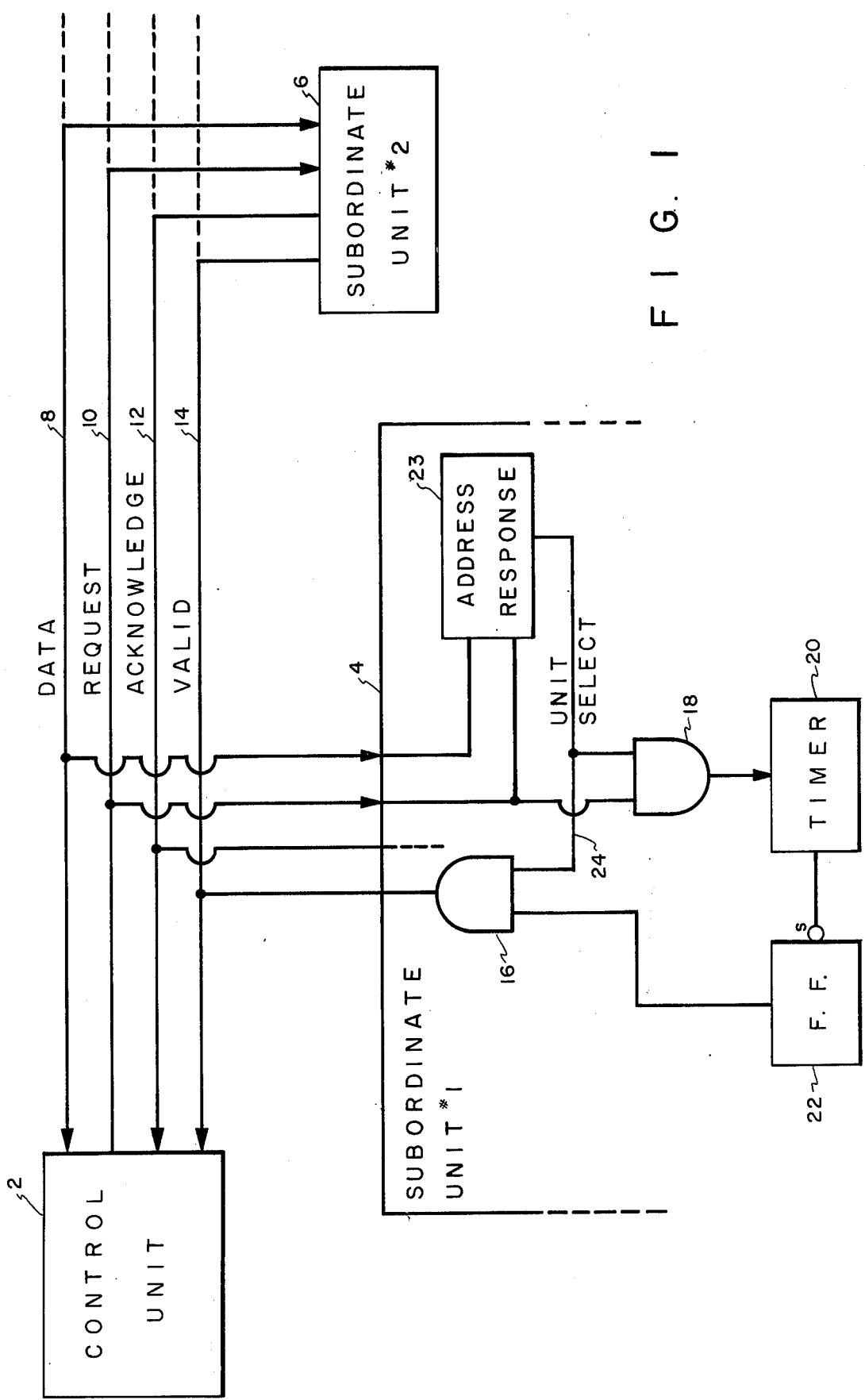
FIG. 1 is a schematic logic diagram of an interface for a computer system embodying the present invention.

Referring now to the drawings in more detail, there is shown, in FIG. 1, a control unit 2 and a plurality of subordinate units represented by the units 4 and 6. The control unit is connected to the several subordinate units by a communication bus represented by four communication channels; a "data" channel 8, a "request" channel 10, an "acknowledge" channel 12 and a "valid" channel 14. The subordinate units are connected in parallel to the communication bus. A validity and timer circuit is included at the location of each of the subordinate units although it is electrically a part of the control unit. The validity and timer circuit includes a first AND gate 16 and a second AND gate 18, a timer 20 and a flip-flop 22. The AND gate 16 has one input terminal connected to the output of the flip-flop 22. A second input to the gate 16 is connected to respond to a "unit select" signal from an address response circuit 23. The second AND gate 18 has one input terminal connected to the request channel 10 of the communication bus; the second input terminal of the gate 18 being also connected to respond to the "unit select" signal. The output of the gate 18 is connected to initiate the operation of the timer 20. The output of the timer 20 is connected to the "set" input terminal of the flip-flop 22. The output of the gate 16 is connected to the "valid" channel 14 of the communication bus.

In operation, the control unit 2 issues an address for one of the subordinate units, for example, the unit 4, on the "data" channel 8 and issues a "unit select" signal on the "request" channel 10. The combination of the address information and the "unit select" signal from the control unit is recognized by the address response circuit 23 of the addressed subordinate unit, i.e., unit 4, and the "unit select" signal is returned on the lead 24. The flip-flop 22 is normally in the state of having a high level output signal applied to one of the leads of the gate 16. The occurrence of the "unit select" signal on the lead 24 connected to the other input terminal of the gate 16 causes an output signal from the gate 16 to be applied to the "valid" channel 14 of the communication bus, then returned to the control unit as a signal that the addressed subordinate unit is present and basically operational. The concurrence of the command on the request channel 10 and the return "unit select" signal on the lead 24 applied as input signals to the gate 18 produce a high output signal from the gate 18 as an initiating signal for the timer 20. The timer 20 in each of the subordinate units is adjusted to produce an output signal after the passage of a time period slightly longer than the maximum response time of the particular subordinate unit with which it is associated. If that particular subordinate unit has performed the operation assigned to it within the framework of the response time, an acknowledge signal will be generated within the subordinate unit and applied to the "acknowledge" channel 12 of the communication bus and returned to the control unit to effect a release of the control unit for its next operation. If, through some malfunction of the subordinate unit, an "acknowledge" signal has not been generated within the prescribed time, the timing out of the timer 20 produces a "reset" signal for the flip-flop 22, turning off the gate 16, thereby withdrawing the "valid" signal applied to the "valid" channel 14. The withdrawal of the "valid" signal is accepted by the control unit to effect a release of that control unit allowing it to advance to its next scheduled operation.

Figure 2:
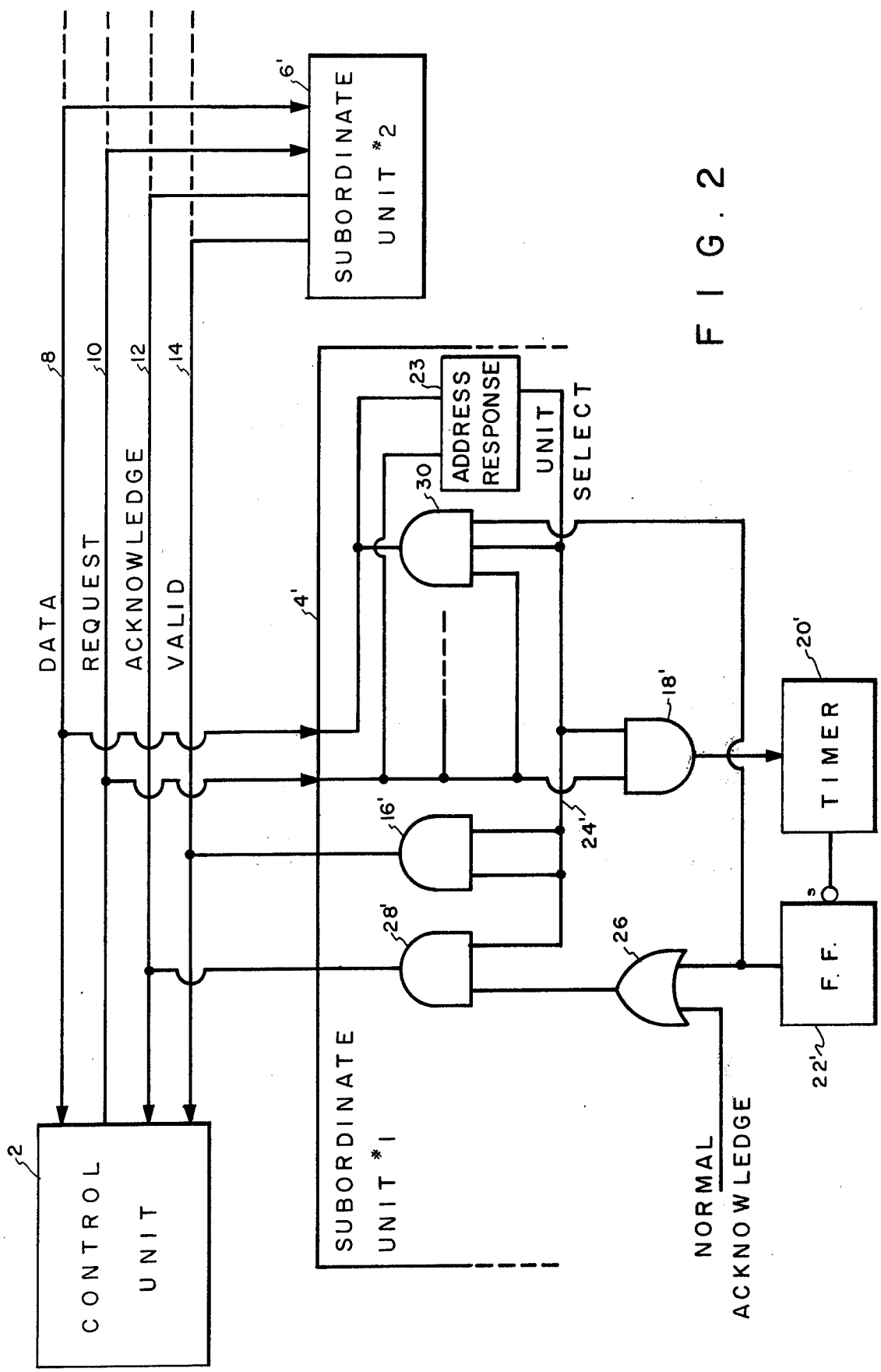
FIG. 2 is a schematic logic diagram of a different form of interface for a computer system and also embodying the present invention.

In FIG. 2, there is shown a system similar to that shown in FIG. 1 but with a somewhat different arrangement for the interface means of the subordinate unit. In FIG. 2, the component parts that are the same as those shown in FIG. 1 bear identical reference numerals; those that are similar bear similar reference numerals but primed. Thus, the control unit 2 exercises authority over a plurality of subordinate units 4' and 6'. The control unit is connected to the several subordinate units, again, by a communication bus represented by four communication channels; a "data" channel 8, a "request" channel 10, an "acknowledge" channel 12 and a "valid" channel 14. A validity and timer circuit is included at the location of each of the subordinate units as before. The validity and timer circuit includes a first AND gate 16' having both input terminals connected together and to a lead 24' to respond to a "unit select" signal from an address response circuit 23'. A second AND gate 18' has one input terminal connected to the lead 24' to respond to the "unit select" signal; a second input terminal of the AND gate 18' is connected to the "request" channel 10. The output of the AND gate 18' is connected to initiate the operation of a timer 20'. The output of the timer 20' is connected to the input terminal of a flip-flop 22'. The output of the flip-flop 22' is connected to one input terminal of an OR gate 26. The other input of which is connected to a source of normal acknowledge signal. The output of the OR gate 26 is connected to one input terminal of a third AND gate 28. The other input of the AND gate 28 is connected to the "unit select" lead 24'. The otput of the AND gate 28 is connected to the "acknowledge" channel 12. The output of the AND gate 16' is connected to the "valid" channel 14. A fourth AND gate 30 also has one input terminal connected to the "unit select" lead 24'. Another input of the AND gate 30 is connected to the output of the flip-flop 22'. A third input to the AND gate 30 is connected to the "request" channel 10. The output of the AND gate 30 is connected to the "data" channel 8.

In the operation of the structure of FIG. 1, the control unit is effectively released from the malfunctioning subordinate unit by the removal of the "valid" signal. With such a removal, however, the control unit has effectively lost contact with that subordinate unit. If it is desired that the control unit be able to come back to the subordinate unit to perform a diagnostic analysis of the nature of the failure there must be a way of keeping that subordinate unit on line. The structure illustrated in FIG. 2 provides means for releasing the control unit to proceed with its orderly business and, yet, maintain the subordinate unit on line, available for the control unit to come back to perform its diagnostic routine.

As before, the control unit 2 issues an address for one of the subordinate units such as the unit 4' on the "data" channel 8 then issues a "unit select" signal on the "request" channel 10. The combination of the address information and the "unit select" signal from the control unit is recognized by the address response circuit 23' of the addressed subordinate unit, i.e., unit 4' and the "unit select" signal is returned on the lead 24'. The occurrence of the "unit select" signal on the lead 24' connected to both input terminals of the AND gate 16' causes an output signal from the gate 16' to be applied to the "valid" channel 14 of the communication bus, thence, to the control unit as before. The coincidence of the "unit select" signal on the lead 24' and the "request" signal on the "request" channel 10, applied to the input terminals of the AND gate 18' initiate the operation of the timer 20'. As before, the timer 20' is adjusted to time-out after a period slightly longer than the normal response time of the subordinate unit with which it is associated. In this configuration, the output of the flip-flop 22' is normally at a low level output which is applied to one of the two input terminals of the OR gate 26. If the subordinate unit responds in a normal manner, a normal acknowledge signal will be applied to the other input terminal of the OR gate 26 and transmitted therethrough to one of the input terminals of the AND gate 28. The AND gate 28 will have been already enabled by the "unit select" signal on the lead 24' applied to the other input terminal thereof. That will, in turn, produce an output signal from the gate 28 to the "acknowledge" channel 12 and return it to the control unit to effect a releasing thereof for continuation of its program.

If, on the other hand, the subordinate unit malfunctions, allowing the timer 20' to time-out, the flip-flop 22' will be "set" to produce a high level output signal. That high level output signal will be applied to one of the input terminals of the OR gate 26, thence, to the input terminal of the AND gate 28. As before, the AND gate 28 is enabled by the signal on the "unit select" lead 24'. Accordingly, a simulated "acknowledge" signal is produced at the output of the AND gate 28 and applied to the "acknowledge" channel 12 for return to the control unit 2. Again, the control unit 2 is released to continue its program. The "valid" signal, in the meantime, remains applied to the channel 14. The high level output signal from the flip-flop 22' is also applied to one of the input terminals of the AND gate 30, to which has also been applied the "unit select" signal on the lead 24'. When a request for data signal is issued by the control unit 2, on the "request" channel 10, the AND gate 30 is enabled. The resulting output signal from the AND gate 30 is applied to the "data" channel 8 and fed back to the control unit 2 as a signal that there is an error condition existing in the identified subordinate unit. With the "valid" signal still on the line identifying the subordinate unit and the error signal on the "data" channel, the control unit may then institute a diagnostic routine to either correct or determine the nature of the failure of the subordinate unit.

Thus, there has been provided, in accordance with the present invention, an improved interface which effects improved communication between a control unit and any of a plurality of subordinate units with a minimum of time-out period.

The embodiments of the invention in which an exclusive property or privilege is claimed are defined as follows:

1. In a computer system including a control unit having authority over a plurality of subordinate units with response times which may be different from each other, said control unit communicating with said subordinate units by a communication bus over which command and response messages are transmitted between said control unit and said subordinate units,
   an interface unit associated with each of said subordinate units,
   each of said interface units including an output signal means responsive to a unit selection issued by said control unit to a selected subordinate unit, means including said communication bus for transmitting said output signal to said control unit as a validation of the unit selection,
   each of said interface units further including a timing means,
   means for initiating the operation of said timing means in response to said unit selection issued by said control unit, each of said timing means being arranged to define a time period slightly longer than the response time of the particular subordinate unit associated therewith and to produce a time-out signal at the end of the defined period,
   and means responsive to said time-out signal for terminating said validation output signal whereby to release said control unit from the selected subordinate unit in a minimum time in the event of a failure of a normal performance response from said selected subordinate unit.

2. In a computer system including a control unit having authority over a plurality of subordinate units with response times which may be different from each other, said control unit communicating with said subordinate units by a communication bus over which command and response messages are transmitted between said control unit and said subordinate units,
   an interface means associated with each of said subordinate units,
   each of said interface means including an output signal means comprising a first gating means responsive to a unit selection command issued by said control unit to effect a selection of one of said subordinate units, means including said communication bus for transmitting an output signal from said gating means to said control unit as a validation of the unit selection,
   each of said interface means further including a timing means,
   a second gating means responsive to said unit selection command issued by said control unit for initiating the operation of said timing means, each of said timing means being arranged to define a time period slightly longer than the response time of the particular subordinate unit associated therewith and to produce a time-out signal at the end of the defined period,
   and means responsive to said time-out signal for terminating said validation output whereby to release said control unit from subordinate unit in a minimum time in the event of a failure of a normal response from said selected subordinate unit.

3. In a computer system including a control unit having authority over a plurality of subordinate units with response times which may be different from each other, said control unit communicating with said subordinate units by a communication bus over which command and response messages are transmitted between said control unit and said subordinate units,
   an interface means associated with each of said subordinate units, each of said interface means including an output signal means comprising a first gating means responsive to a unit selection command issued by said control unit to effect a selection of one of said subordinate units, means including said communication bus for transmitting an output signal from said gating means to said control unit as a validation of the unit selection,
   each of said interface means further including timing means,
   a second gating means responsive to said unit slection command issued by said control unit for initiating the operation of said timing means, each of said timing means being arranged to define a time period slightly longer than the response time of the particular subordinate unit associated therewith and to produce a time-out signal at the end of the defined period, and
   a flip-flop means having an output connected as an enabling signal for said first gating means, said flip-flop being connected to be responsive to said time-out signal for terminating said validation output signal whereby to release said control unit from said selected subordinate unit in a minimum time in the event of a failure of a normal performance response from said selected subordinate unit.

4. In a computer system including a control unit having authority over a plurality of subordinate units with response times which may be different from each other, said control unit communicating with said subordinate units by a communication bus over which command and response messages are transmitted between said control unit and said subordinate units,
   an interface unit associated with each of said subordinate units,
   each of said interface units including an output signal means responsive to a unit selection issued by said control unit to a selected subordinate unit, means including said communication bus for transmitting said output signal to said control unit as a validation of the unit selection,
   each of said interface units further including a timing means,
   means for initiating the operation of said timing means in response to said unit selection issued by said control unit, each of said timing means being arranged to define a time period slightly longer than the response time of the particular subordinate unit associated therewith and to produce a time-out signal at the end of the defined period,
   and means responsive to said time-out signal for effecting a control signal on said communication bus whereby to release said control unit from the selected subordinate unit in a minimum time in the event of a failure of a normal performance.

5. In a computer system including a control unit having authority over a plurality of subordinate units with response times which may be different from each other, said control unit communicating with said subordinate units by a communication bus over which command and response messages are transmitted between said control unit and said subordinate units, an interface unit associated with each of said subordinate units, each of said interface units including output signal means response to a unit selection issued by said control unit to a selected subordinate unit, means including said communication bus for transmitting said output signal to said control unit as a validation of the unit selection, each of said interface units further including a timing means, means for initiating the operation of said timing means in response to said unit selection issued by said control unit, each of said timing means being arranged to define a time period slightly longer than the response time of the particular subordinate unit associated therewith and to produce a time-out signal at the end of the defined period, and means responsive to said time-out signal for providing a simulated "acknowledge" signal on said communication bus whereby to release said control unit from the selected subordinate unit in a minimum time in the event of a failure of a normal performance response from said selected subordinate unit.

6. In a computer system including a control unit having authority over a plurality of subordinate units with response times which may be different from each other, said control unit communicating with said subordinate units by a communication bus over which command and response messages are transmitted between said control unit and said subordinate units, an interface means associated with each of said subordinate units, each of said interface means including output signal means comprising a first gating means responsive to a unit selection command issued by said control unit to effect a selection of one of said subordinate units, means including said communication bus for transmitting an output signal from said gating means to control unit as validation of the unit selection, each of said interface means further including a timing means, a second gating means responsive to said unit selection command issued by said control unit for initiating the operation of said timing means, each of said timing means being arranged to define a time period slightly longer than the response time of the particular subordinate unit associated therewith and to produce a time-out signal at the end of the defined period, a third gating means responsive to said time-out signal for producing a simulated acknowledge signal and means including said communication bus for transmitting said simulated acknowledge signal to said control unit whereby to release said control unit from the selected subordinate unit in a minimum time in the event of a failure of a normal response from said selected subordinate unit.

7. In a computer system including a control unit having authority over a plurality of subordinate units with response times which may be different from each other, said control unit communicating with said subordinate units by a communication bus over which command and response messages are transmitted between said control unit and said subordinate units, an interface means associated with each of said subordinate units, each of said interface means including output signal means comprising a first gating means responsive to a unit selection command issued by said control unit to effect a selection of one of said subordinate units, means including said communication bus for transmitting an output signal from said gating means to said control unit as a validation of the unit selection, each of said interface means further including a timing means, a second gating means responsive to said unit selection command issued by said control unit for initiating the operation of said timing means, each of said timing means being arranged to define a time period slightly longer than the response time of the particular subordinate unit associated therewith and to produce a time-out signal at the end of the defined period, a third gating means responsive to said time-out signal for producing a simulated acknowledge signal, means including said communication bus for transmitting said simulated acknowledge signal to said control unit whereby to release said control unit from the selected subordinate unit in a minimum time in the event of a failure of a normal response from said selected subordinate unit, and a fourth gating means responsive to said time-out signal for producing an error flag signal for transmission by said communication bus to said control unit as an indication of an error condition.

8. In a computer system including a control unit having authority over a plurality of subordinate units with response times which may be different from each other, said control unit communicating with said subordinate units by a communication bus over which command and response messages are transmitted between said control unit and said subordinate units, an interface means associated with each of said subordinate units, each of said interface means including output signal means comprising a first gating means responsive to a unit selection command issued by said control unit to effect a selection of one of said subordinate units, means including said communication bus for transmitting an output signal from said gating means to said control unit as a validation of the unit selection, each of said interface means further including a timing means, a second gating means responsive to said unit selection command issued by said control unit for initiating the operation of said timing means, each of said timing means being arranged to define a time period slightly longer than the response time of the particular subordinate unit associated therewith and to produce a time-out signal at the end of the defined period, a flip-flop means connected to said timing means, said flip-flop means being responsive to said time-out signal to change the state of its output signal, an OR gate having one input terminal connected to a source of normal acknowledge signals and a second input terminal connected to said output signal of said flip-flop, a third gating means responsive to output signals from said OR gate to provide a acknowledge signal, selectively normal or simulated, for transmission to said control unit whereby to release said control unit from the selected subordinate unit in a minimum time in the event of a failure of a normal performance response from said selected subordinate unit, and a fourth gating means responsive to said output signal from said flip-flop means in response to said time-out signal for producing an error flag signal for transmission to said control unit as an indication of an error condition.

* * * * *